Oct. 19, 1965

H. E. SAUNDERS ETAL 3,213,010

VERTICAL DROP ATMOSPHERIC SENSOR

Filed June 10, 1960

To Electrodes 37
And 39 Of Fig. 2

INVENTORS
Hugh E. Saunders
BY Kenneth G. Riddle

*William Grobman*

ATTORNEY

INVENTORS
Hugh E. Saunders
Kenneth G. Riddle
BY
*William Grobman*
ATTORNEY

INVENTORS
Hugh E. Saunders
Kenneth G. Riddle
BY
*William Grobman*
ATTORNEY

United States Patent Office 3,213,010
Patented Oct. 19, 1965

3,213,010
VERTICAL DROP ATMOSPHERIC SENSOR
Hugh E. Saunders, Moline, Ill., and Kenneth G. Riddle, Davenport, Iowa, assignors to Mast Development Company, Inc., Davenport, Iowa
Filed June 10, 1960, Ser. No. 35,316
5 Claims. (Cl. 204—195)

This invention relates to measuring and testing devices, and, more particularly, to devices for measuring the amounts of select constituents of gaseous mixtures.

The gaseous mixture most important to man is the earth's atmosphere. In addition to the handful of major components which, as children, we were taught comprises the air which makes up the earth's atmosphere, there are also a large number of trace constituents. With the recent improvements in testing equipment and techniques has come the realization that the proportions of the individual atmospheric trace constituents vary from place-to-place and from time-to-time. In addition, the changes in the constitution of the atmosphere are often signs of atmospheric disturbances, bursts of intense radiation, or other such transient phenonena.

Meteorologists have used balloon-borne atmospheric test equipment for many years. The early devices recorded conditions aloft, and, if not damaged or lost during descent, the records were recovered and studied. Developments in radio telemetry and miniaturization of electronic equipment have meant that test devices borne aloft could transmit their readings to ground stations while in transit. This greatly improved the versatility of the equipment and increased the amount of data recovered. In addition to the test equipment installed in balloons, often called radio-sondes, smaller free-falling units are now also used. The free-falling units, termed "drop-sondes," are carried aloft by airplanes, rockets, balloons, and the like, and are then released. Their fall may be either completely free, or may be retarded by parachutes to a desired descent velocity. A parachute drop from 45,000 feet may then take about 15 minutes, during which time the test data gathered by the equipment is transmitted to ground or aircraft stations by a transmitter frequency-modulated by the test results.

Because of their small size and the limited power supplies which they can carry, drop-sondes can use only that test equipment which is small, lightweight, self-contained, and automatic. For these reasons, the inclusion of equipment for measuring the amounts of atmospheric trace constituents at high altitudes has been rare. Further, most trace consituent test equipment is neither automatic nor suitable for continuous operation, and massive apparatus is usually required to achieve accurate results.

There are many cells, half cells, and other electrolytic devices for indicating the presence of individual components of solutions and gaseous mixtures. However, most of the prior art devices depend upon a reduction-oxidation type of reaction to produce their indications. Until now, such a reaction was suitable for indicating the presence or absence of a desired constituent, but the amount of the constituent present was not determinable by such methods alone. Considering, by way of example only, ozone as the constituent to be detected and measured, potassium iodide has been, for many years, used as a specific reagent for detecting its presence in a fluid mixture. However, when an accurate measurement of the percentage or amount of ozone present was required, a separate additional reaction was required. To prevent the iodine liberated from the potassium iodide solution by the ozone or other oxidant from building up in the solution and reentering the reaction at the cathode or increasing the electrical conductivity of the solution, sodium thiosulphate was titrated into the potassium iodide solution. Without the addition of sodium thiosulphate, or other such additive, it was very difficult to measure the amount of ozone which reacted with the potassium iodide. Obviously, the apparatus required for the titration of the sodium thiosulphate, added to the equipment for detecting the reaction between an oxidant and the potassium iodide, became too massive for drop- or radio-sonde use.

It is an object of this invention to provide new and improved equipment for measuring atmospheric trace constituents.

It is another object of this invention to provide new and improved apparatus for measuring the amounts of trace constituents in a fluid mixture.

It is a further object of this invention to provide new and improved automatic equipment for measuring atmospheric trace constituents.

It is yet another object of this invention to provide new and improved portable and lightweight apparatus for measuring the amounts of selected trace constituents in the atmosphere.

It is yet a further object of this invention to provide new and improved portable and automatic apparatus suitable for high altitude use in determining the amounts of trace constituents in the earth's atmosphere.

Other objects and advantages of this invention will become apparent as the following description proceeds, which description should be taken together with the accompanying drawings, in which.

Figure 1:
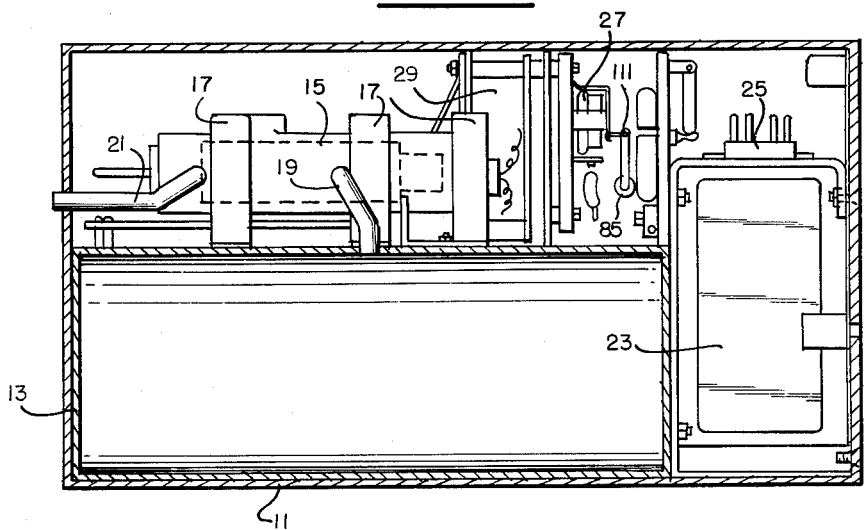
FIG. 1 is a sectional view of the apparatus of this invention.

Referring now to the drawings in detail, and more particularly to FIG. 1, the reference character 11 designates a rigid, generally cylindrical housing of metal, wood, synthetic resin, or other suitable material. A tank 13 is mounted within the housing 11 and supports sensing apparatus 15 by means of bands 17. A tube 19, of material such as glass or polyethylene inert to the constituent being investigated, connects the sample outlet of the sensor 15 with the single input to the tank 13, and a second tube 21 similar to the tube 19 serves to connect the interior of the sensor 15 with the atmosphere to be sampled exterior to the housing 11. Adjacent the tank 13 is a chassis and housing 23 containing the electronic equipment, better shown in FIG. 3, which converts the electrical output from the sensor 15 into a form suitable for modulating the transmitter within a sonde. Connections to the electronic equipment in the housing 23 are effected by means of a socket 25 so that the individual portions of the equipment are readily separable. Metered amounts of reagent are steadily injected into the sensor 15 by a spring motor 29 which is supported within the housing 11 adjacent the sensor. The small potential required for sensor operation is supplied by a small battery 27.

Figure 2:
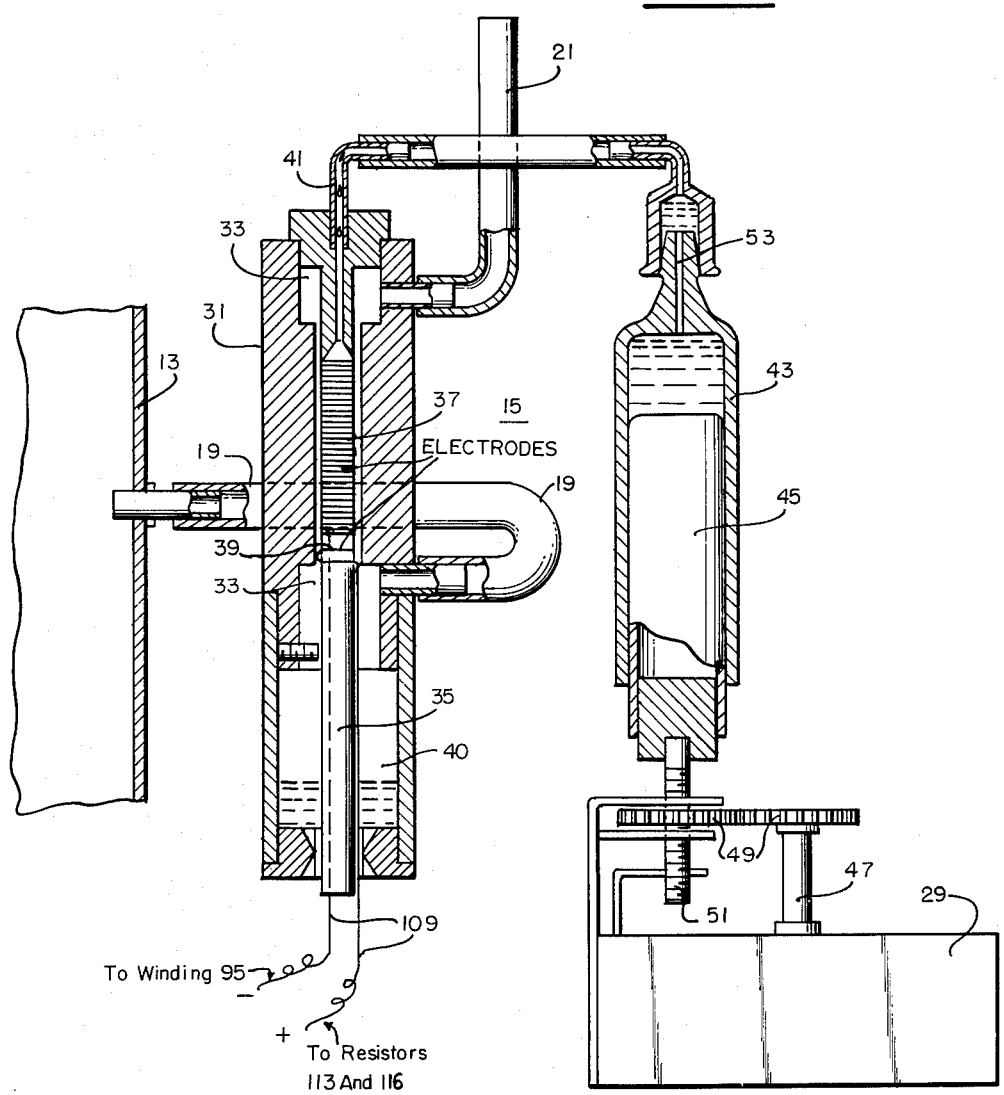
FIG. 2 is a sectional view of a portion of the apparatus of FIG. 1.

FIG. 2 illustrates the sensor 15 together with the air and reagent pumps in greater detail. The sensor 15 is shown and described in detail in the copending application S.N. 743,234, of A. W. Brewer et al., now Patent 3,038,848, issued on June 12, 1962, and comprises a generally cylindrical housing 31 having a central bore 33. A rod 35 having an outside diameter slightly less than the internal diameter of the bore 33 is supported therein and carries an electrode 37 spirally extending longitudinally on its surface. A second electrode 39 consisting of one or two closely wrapped turns of wire is also carried by the rod 35 spaced from the larger electrode 37. The gas sample to be tested enters the bore 33 through the tube 21, passes through the annular space between the inside of the bore 33 and the outside of the rod 35, and is exhausted through the tube 19 into the tank 13. As best seen in FIG. 1, the tank 13 has but the one opening which is connected to the tube 19. Reagent enters the bore 33 through a tube 41, passes in a thin film down the outer surface of the rod 35, flowing over and wetting the electrodes 37 and 39, chiefly by gravity. Because the reagent is moved through the annular space within the housing 31 chiefly by gravity, the sensor 15 operates with the tube 21 higher than the waste reservoir 40. Except for the electronic equipment illustrated in FIG. 3, the sensor 15 shown in FIG. 2 constitutes a complete testing instrument and does not require additional apparatus to produce accurate quantitative results. For this reason, this sensor is particularly adaptable to small, portable uses such as in radio- and drop-sondes.

In use, it is necessary to provide a known flow through the sensor 15 of the gaseous mixture to be tested. For high altitude drop operation, the tank 13 serves as a self-metering pump to achieve this fluid flow. Since the tank 13 has only one opening, that through the tube 19, the bore 33 and the tube 21; when the unit is rendered operational, the pressure within the tank 13 is essentially that of the external ambient atmosphere. Thus, when the apparatus has been borne aloft and is released for its descent, the pressure within the tank 13 is at its lowest, and as the unit falls, the external atmospheric pressure gradually increases, forcing air slowly through the sensor 15 and into the tank 13. In addition to the flow of air through the annular space between the bore 33 and the rod 35, a steady, if slow, flow of reagent is also necessary. When the apparatus is dropped, it is oriented with the tube 21 in FIG. 1 vertical and with the electronic equipment in the housing 23 at the bottom. The sensor falls oriented as it is shown in FIG. 2. This is accomplished by means of a spring motor 29 which slowly rotates a shaft 47 to drive gears 49. The rotation of gears 49 drives a lead screw 51 at a very slow rate to move a piston 45 into syringe 43 containing the reagent. As the piston is moved upwardly, as shown in FIG. 2, the reagent is slowly forced from the syringe 43, the pipe 53, and the tube 41 into the bore 33. Gravity then causes the reagent to slowly flow in a thin film down over the rod 35 and the electrodes 37 and 39, completely wetting them.

The gas sample passing through the sensor 15 and the reagent flowing down over the rod 35 both move steadily through the bore 33. Since the annular space between the rod 35 and the wall of the bore 33 is quite small, there is an intimate mingling of the gas sample and the reagent for a comparatively long time interval. The two substances are in contact for a sufficient length of time to assure complete reactions. When a small potential, below the ionizing potential of the reagent, is applied between the electrodes 37 and 39 (if ozone is being measured, electrode 37 is a cathode), the electrodes are polarized, and a thin layer of hydrogen gas is formed on the cathode. The polarization of the electrode 37 effectively cuts off the flow of current through the sensor 15. However, if the gas sample passing through the bore 33 contains a strong oxidant, such as ozone, it reacts with the reagent, the products of this reaction in turn reacting with the hydrogen about the cathode. This reaction at the cathode removes a quantity of the hydrogen gas, and current must again flow in the external circuit to re-establish the equilibrium of the polarization potential. The current then flowing is directly proportional in amplitude to the number of electrons released by the reaction, and, therefore, proportional to the number of molecules per unit volume of the oxidant which releases the electrons. Since an equivalent number of electrons flow into the lower electrode 39 to complete the electrical circuit, the products of reduction formed at electrode 39 must not be allowed to reach the upper electrode 37 where they could again enter the reaction and cause additional current to flow in the external circuit. The spent solution is carried by gravity downward into the storage chamber 40, thus preventing any reaction products in the spent solution from contacting the upper electrode 37 and enabling the sensor to accurately measure the oxidant present in the air sample. The electrodes 37 and 39 are connected by wires 109 to appropriate portions of the circuit shown in FIG. 3.

Figure 3:
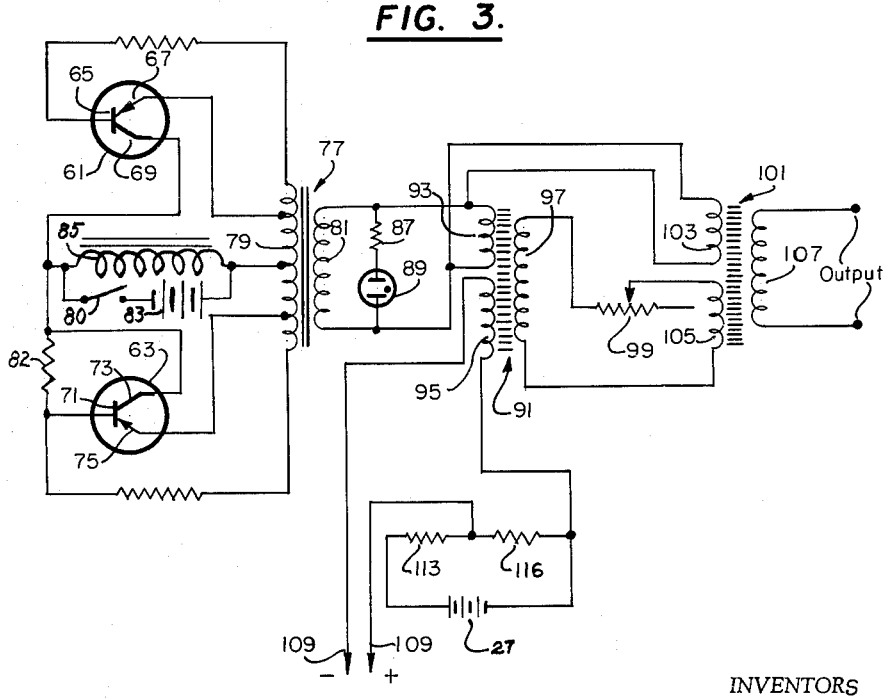
FIG. 3 is a wiring diagram of the electrical system and amplifier used in apparatus of this invention.

In the electronic portion of the apparatus, shown in FIG. 3, a small source of direct electrical energy, such as battery 27 supplies a small potential to the electrodes 37 and 39 by way of a potential divider comprising serially connected resistors 113 and 116. One of the resistors 113 or 116 may be a potentiometer for adjustment purposes, if desired. The voltage appearing across resistor 116 is applied to the series circuit comprising winding 95 of a saturable core amplifier 91 and the electrodes 37 and 39 of the sensor 15, with the electrode 37 being negative with respect to electrode 39. An oscillator comprising a switching saturable core 77 having a primary 79 and a secondary 81, and two transistors 61 and 63, supplies alternating energy to the signal winding 93 of the amplifier 91. Energy is supplied to the oscillator from a source 83 of direct energy through a switch 80. The switch 80 is closed when the unit is released for its descent, and the completed circuit also energizes solenoid coil 85 which pulls a restraining pin 115 to initiate operation of the spring motor 29. A neon tube 89 is connected in series with a resistor 87 across the secondary 81 and is used for testing the operation of the oscillator before the instrument is released. The tube 89 and resistor 87 may be removed after testing since they serve no other purpose.

The output coil 97 of the amplifier 91 is connected across the bias coil 105 of a second saturable amplifier 101 through a potentiometer 99 which serves as a gain control. The output from this instrument is taken from the output winding 107 of the amplifier 101 and is in proper form and of a sufficient amplitude to suitably modulate a transmitter.

In operation, the transistors 61 and 63 and the saturable transformer 77 act as a high speed switch to generate a generally square wave output signal much as a free running multivibrator. For proper operation, the core of transformer 77 must have a generally rectangular hysteresis loop. When switch 80 is closed, one transistor, 61 or 63, will conduct slightly more than the other due at least to the differences in the circuit introduced by resistor 82. Assuming that conduction through transistor 63 is heavier, current flows from emitter 75, through the winding 79, and into the collector 73. This makes the emitter connection on winding 19 positive with respect to the collector connection and induces similar potentials in the other windings. A negative potential is applied to the base electrode 71, driving the transistor 63 into heavier conduction. At the same time, base electrode 65 is driven positive, cutting off conduction through transistor 61. This operation continues until the core is saturated, when the lack of further flux changes in the core reduces the induced potentials to zero. Transistor 63 then cuts off. When conduction through the winding 79 stops, the core condition drops back from its saturation point to its remanence point, a change opposite to the earlier mentioned changes. This induces voltages of opposite polarity in the winding 79, reversing the condition of conduction and initiating conduction through transistor 61. This operation produces a substantially square wave signal which is applied to excitation windings 93 and 103 of the magnetic amplifiers 91 and 101 in parallel.

The saturation of the amplifier 91 core is controlled by the current flowing between electrodes 37 and 39 of the sensor 15 and through the control winding 95. This, in turn, determines the signal output in winding 97 which is applied to the control winding 105 through the potentiometer 99. Conduction in winding 109 determines the saturation of the amplifier 101 core and the amount of signal induced in the output winding 107. Thus, the amplitude of the signals applied to the sonde transmitter (not shown) is proportional to the amount of trace constituent in the gas sample being tested.

Figure 4:
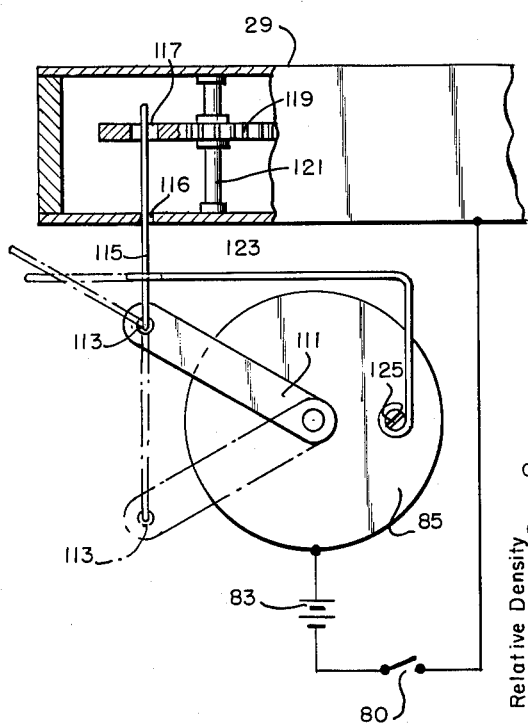
FIGS. 4 and 5 are schematic showings of the mechanism for starting the reagent pump.
Figure 5:
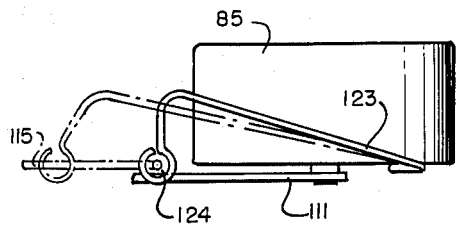

The mechanism for preventing the operation of the spring motor 29 until desired is better shown in FIGS. 4 and 5. The solenoid 85 comprises a rotatably movable arm 111 having a perforation 113 through its remote end. The pin 115 is loosely supported for movement in the perforation 113 and passes through a guide hole 124 in one end of a guide rod 123. The other end of the guide rod 123 is attached to the solenoid 85 by means of a screw 125 or other fastening means. The restraining pin 115 passes through hole 116 in the housing of the spring motor 29 and through a hole 117 in a gear 119 of the motor 29 gear train. As long as the pin 115 is present in the two holes 116 and 117, the gear 119 is prevented from turning on its shaft 121 and the motor 29 remains wound, but inoperative. The battery 83 has one side connected to one side of the solenoid 85 and the other side connected through switch 80 to the casing of the motor 29. The circuit to the other side of the solenoid 85 is completed through pin 115 and arm 111.

When the switch 80 is closed to energize the equipment of the drop sonde for descent, the solenoid 85 is energized from the battery 83. The arm 111 is rotated to the position shown in FIG. 4 in dashed lines, effectively withdrawing pin 115 from the holes 116 and 117 to allow the motor 29 to operate and breaking the circuit between the battery 83 and the solenoid 85. When the pin 115 leaves the hole 116, the guide rod 123, which is resiliently held in its solid line position, unbends, as shown in FIGS. 4 and 5, and assumes the dashed line position. This moves the pin 115 away from the casing of the motor 29 when the arm 111 returns to its initial position and prevents the reestablishment of the solenoid 85 circuit to reduce the drain on the battery 83.

Figure 6:
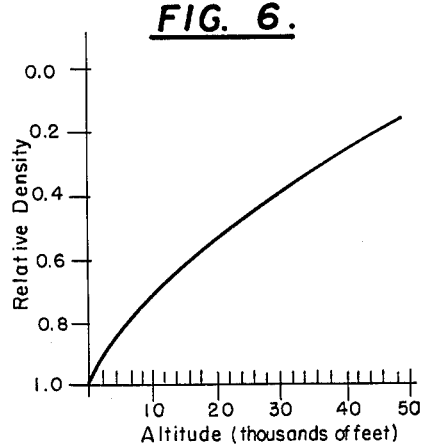
FIG. 6 is a curve of the density of the atmosphere at various altitudes.

In addition to ensuring a smooth and continuous flow of air through the sensor 15, the air pump 13 also provides an easy means for determining the amount of air flowing through the unit. The rate of flow of the air sample through the system can be represented by the following equation:

$$A = 2.68 \times 10^{19}(P_1 - P_0)V/\Delta t$$

where:

$A$ = air flow in cc./min.
$P_1$ = relative atmospheric density at $t_1$
$P_0$ = relative atmospheric density at $t_0$
$V$ = volume of tank 13 in cc.
$\Delta t$ = elapsed time $(t_1 - t_0)$ in minutes This relationship is true when the pressure within the tank 13 is essentially equal to that of the ambient atmosphere and if the slight effect of a small difference between the temperatures of the tank and the atmosphere is neglected. A curve showing the densities of the air at different altitudes is shown in FIG. 6. Values for such curves may be obtained from many publications such as "U.S. Extension to the ICAO Standard Atmosphere," published by the Weather Bureau of U.S. Department of Commerce. With the atmospheric densities readily obtainable and the rate of descent known, the tank size and system can be designed to meet requirements for air sample flow rates. No calibration, other than the tank volume, is necessary to provide a fully predictable air pumping system. Since temperature and pressure instruments are usually incorporated in sondes, all of the necessary variables for computing the flow of air through the sensor 15 are readily available without the need for the elaborate calibrating and continuous monitoring system required for conventional mechanical pumps to obtain accuracy.

This specification has described a new and improved atmospheric trace constituent tester which is compact, self-contained, accurate and automatic and which is particularly suited to high altitude testing. It is realized that a reading of this specification may suggest to those in the art other forms this invention might assume, and it is, therefore, intended that this invention be limited only by the scope of the appended claims.

What is claimed is:

1. A self-contained test instrument adapted to be carried aloft to a high altitude and permitted to fall to earth while measuring the amount of an oxidant other than $O_2$ in air as it falls; said instrument comprising a narrow, elongated, annular reaction chamber; a first electrode spirally disposed along substantially the entire length of the inner wall of said reaction chamber; said chamber having a fluid input end and an exhaust end; a second electrode spaced from said first electrode within said chamber; means for causing air to flow through said reaction chamber; said air flow means comprising a container having a single opening; means for connecting said single opening to the exhaust end of said reaction chamber whereby air entering said container passes through said reaction chamber; said air flow means being constructed to automatically assume an internal pressure substantially equal to the ambient pressure at the highest elevation to which the device is raised so that it serves to suck air through said reaction chamber as the instrument descends from an altitude of low ambient pressure to one of higher ambient pressure; means for injecting into said reaction chamber a reagent specific to the oxidant being measured; said means for injecting a reagent comprising a reservoir containing an excess of said reagent; a pump in said reservoir adapted to force said reagent from said reservoir at a prescribed rate; means for connecting the exit from said reservoir with the input end of said reaction chamber whereby reagent forced from said reservoir is released into said reaction chamber to flow over said first and second electrodes under the influence of gravity; drive means for operating said pump from stored energy; and means for connecting a source of electrical energy and electrical detection means to said first and second electrodes.

2. A device for continuously determining the amounts of a trace constituent present in the earth's atmosphere at a plurality of altitudes, said device comprising a housing, said housing containing a trace constituent sensor having a first and a second electrode, said sensor means further comprising an air inlet and an air exhaust, pump means for causing air to be tested to flow into said air inlet and through said sensor, said air pump means comprising a rigid hollow vessel having a single opening, means for connecting said single opening to the exhaust of said sensor, said vessel being open to the atmosphere only through said sensor as the device is dropped to earth so that as the device descends through the atmosphere the atmospheric pressure is higher than that within said vessel and air is forced through said sensor into said vessel, means for injecting a fluid reagent specific to said constituent being measured into said sensor adjacent said inlet at prescribed rates, said injection means comprising a positive displacement pump, means for driving said pump at desired rates, and means for connecting a source of electrical energy and electrical detection equipment to said first and second electrodes.

3. The unit defined in claim 2 wherein said pump comprises a hollow cylinder, a piston positioned in said cylinder, a quantity of reagent in said cylinder filling said cylinder in front of said piston, and wherein said driving means comprises a spring driven motor for slowly advancing said piston to drive the reagent from said cylinder into said sensor.

4. The unit defined in claim 3 wherein said electrical detection equipment comprises a first magnetic amplifier having a signal winding, a control winding and an output winding, and means connecting said control winding in series with said two electrodes.

5. The unit defined in claim 4 further including means for supplying alternating electrical energy to said signal winding and means for connecting said output winding to utilization equipment.

References Cited by the Examiner
UNITED STATES PATENTS

| | | | |
|---|---|---|---|
| 2,651,612 | 9/53 | Haller | 204—195 |
| 2,702,471 | 2/55 | Vonnegut | 73—170 |
| 2,722,658 | 11/55 | Richards | 204—195 |
| 2,740,294 | 4/56 | Sanders et. al. | 73—170 |
| 2,805,191 | 9/57 | Hersch | 204—195 |
| 2,830,945 | 4/58 | Keidel | 204—195 |
| 2,898,282 | 8/59 | Flook et al. | 204—195 |
| 2,943,028 | 6/60 | Thayer et al. | 204—195 |
| 2,962,432 | 11/60 | Tyler | 204—195 |
| 2,987,461 | 6/61 | Sabins | 204—196 |
| 3,038,848 | 6/62 | Brewer et al. | 204—195 |
| 3,050,371 | 8/62 | Dowson et al. | 204—195 |

JOHN H. MACK, *Primary Examiner.*

JOSEPH REBOLD, JOHN R. SPECK, MURRAY TILLMAN, WINSTON A. DOUGLAS, *Examiners.*